US008387733B2

(12) United States Patent
Nakamura (10) Patent No.: US 8,387,733 B2
(45) Date of Patent: Mar. 5, 2013

(54) BATTERY PACK AND VEHICLE
(75) Inventor: Yoshiyuki Nakamura, Nishikamo-gun (JP)
(73) Assignee: Toyota Jidosha Kabushiki Kaisha, Toyota-Shi (JP)
( * ) Notice: Subject to any disclaimer, the term of this patent is extended or adjusted under 35 U.S.C. 154(b) by 1196 days.
(21) Appl. No.: 12/294,528
(22) PCT Filed: Apr. 11, 2007
(86) PCT No.: PCT/JP2007/058387
§ 371 (c)(1),
(2), (4) Date: Sep. 25, 2008
(87) PCT Pub. No.: WO2007/132623
PCT Pub. Date: Nov. 22, 2007
(65) Prior Publication Data
US 2010/0236854 A1 Sep. 23, 2010
(30) Foreign Application Priority Data
May 11, 2006 (JP) ................................. 2006-132906
(51) Int. Cl.
B60K 1/04 (2006.01)
(52) U.S. Cl. ....................... 180/68.5; 180/68.1; 180/68.2
(58) Field of Classification Search ................. 180/65.1, 180/65.31, 68.1, 68.5; 429/71, 120, 148
See application file for complete search history.

(56) References Cited

U.S. PATENT DOCUMENTS

| 4,215,184 | A | * | 7/1980 | Gutmann et al. | 429/101 |
|---|---|---|---|---|---|
| 4,414,291 | A | * | 11/1983 | Breault | 429/434 |
| 4,567,119 | A | | 1/1986 | Lim | |
| 4,629,622 | A | * | 12/1986 | Yonezu et al. | 429/57 |
| 5,187,028 | A | * | 2/1993 | Rogers et al. | 429/101 |
| 5,501,918 | A | * | 3/1996 | Gruenstern et al. | 429/120 |
| 5,560,999 | A | * | 10/1996 | Pedicini et al. | 429/407 |
| 5,753,384 | A | * | 5/1998 | Kimberg | 429/406 |
| 6,235,418 | B1 | * | 5/2001 | Pedicni | 429/407 |
| 6,365,296 | B1 | * | 4/2002 | Young | 429/82 |
| 6,662,891 | B2 | * | 12/2003 | Misu et al. | 180/68.1 |
| 7,319,305 | B2 | * | 1/2008 | Kimoto et al. | 320/150 |
| 7,601,458 | B2 | * | 10/2009 | Hwang et al. | 429/148 |
| 7,618,740 | B2 | * | 11/2009 | Hamada et al. | 429/120 |
| 7,642,002 | B2 | * | 1/2010 | Hamery et al. | 429/120 |
| 7,647,788 | B2 | * | 1/2010 | Okuda et al. | 62/259.2 |
| 7,651,812 | B2 | * | 1/2010 | Kim et al. | 429/100 |
| 7,662,508 | B2 | * | 2/2010 | Lee et al. | 429/120 |
| 7,678,494 | B2 | * | 3/2010 | Tsuchiya | 429/120 |
| 7,682,732 | B2 | * | 3/2010 | Kim et al. | 429/149 |
| 7,700,227 | B2 | * | 4/2010 | Kaneta | 429/159 |
| 7,776,466 | B2 | * | 8/2010 | Oh | 429/153 |
| 7,803,482 | B2 | * | 9/2010 | Higashino et al. | 429/148 |
| 7,810,596 | B2 | * | 10/2010 | Tsuchiya | 180/68.5 |
| 2003/0113621 | A1 | | 6/2003 | Shimamura et al. | |
| 2003/0188901 | A1 | | 10/2003 | Ovshinsky et al. | |
| 2004/0004461 | A1 | * | 1/2004 | Hamada et al. | 320/112 |
| 2004/0232891 | A1 | * | 11/2004 | Kimoto et al. | 320/150 |
| 2004/0261377 | A1 | * | 12/2004 | Sung | 55/385.3 |
| 2005/0011692 | A1 | * | 1/2005 | Takahashi et al. | 180/68.5 |
| 2006/0073378 | A1 | * | 4/2006 | Hamery et al. | 429/120 |
| 2006/0115721 | A1 | * | 6/2006 | Lee et al. | 429/156 |
| 2007/0219670 | A1 | * | 9/2007 | Tanaka et al. | 700/295 |
| 2010/0163325 | A1 | * | 7/2010 | Nakamura | 180/68.5 |

FOREIGN PATENT DOCUMENTS

| JP | 10-340740 A | 12/1998 |
|---|---|---|
| JP | 2001-297740 A | 10/2001 |
| JP | 2002-170601 A | 6/2002 |
| JP | 2003-346924 A | 12/2003 |
| JP | 2004-047161 A | 2/2004 |
| JP | 2004-047262 A | 2/2004 |
| JP | 2005-026219 A | 1/2005 |
| JP | 2005-071784 A | 3/2005 |
| JP | 2005-259379 A | 9/2005 |

OTHER PUBLICATIONS

Decision to Grant mailed Sep. 6, 2011 in JP priority application No. 2006-132906 and English translation thereof.
Supplementary European Search Report dated Feb. 22, 2011.

* cited by examiner

Primary Examiner — J. Allen Shriver, II
Assistant Examiner — Travis Coolman
(74) Attorney, Agent, or Firm — Kenyon & Kenyon LLP (57) ABSTRACT The battery pack of the present invention includes a bipolar secondary battery used as a power source of a vehicle, and a cooling passage allowing flow of a cooling medium. The cooling passage is integrated with a casing. The cooling passage includes an inlet passage provided along that one of a plurality of battery modules which is positioned at one end of the plurality of battery modules for introducing the cooling medium from an input port, an outlet passage provided along that one of the plurality of battery modules which is positioned at the other end of the plurality of battery modules for discharging the cooling medium from an outlet port, and a direction changing portion provided between the inlet passage and the outlet passage changing the flow direction of cooling medium coming from the inlet passage and passing the cooling medium to the outlet passage. According to the present invention, the cooling medium is discharged to the same side as the introducing side. Specifically, the direction of cooling medium flowing in the inlet passage is opposite to the direction of cooling medium flowing in the outlet passage. As the cooling medium is caused to flow in this manner (a so-called counter flow method), temperature distribution in bipolar secondary battery can be made uniform.

8 Claims, 8 Drawing Sheets

BATTERY PACK AND VEHICLE

This is a 371 national phase application of PCT/JP2007/058387 filed 11 Apr. 2007, claiming priority to Japanese Patent Application No. 2006-132906 filed 11 May 2006, the contents of which are incorporated herein by reference.

TECHNICAL FIELD

The present invention relates to a battery pack and a vehicle provided with the battery pack and, more specifically, to a battery pack including a bipolar secondary battery and a casing, as well as to a vehicle mounting the battery pack.

BACKGROUND ART

In connection with accommodation and cooling of a conventional secondary battery, by way of example, Japanese Patent Laying-Open No. 2004-47262 discloses an assembled battery having a plurality of thin secondary batteries electrically connected and stacked. In the assembled battery, a plurality of radiating members are arranged to fill spaces between the plurality of secondary batteries (space between electrode terminals of neighboring thin batteries). In the assembled battery, a cooling medium is caused to flow in one direction to cool the plurality of secondary batteries.

An example of the thin secondary battery described above is a bipolar secondary battery. A bipolar secondary battery generally has a structure having a plurality of bipolar electrodes stacked one after another with an electrolyte interposed. Here, a bipolar electrode means an electrode having a collector member formed as a sheet, with positive electrode active material provided on one surface and negative electrode active material provided on the other surface, of the collector foil. The bipolar secondary battery may have various shapes, and as an example, it has a thin plate shape.

When the bipolar secondary battery is charged/discharged, a current flows in the direction of stacking of the bipolar electrodes. Consequently, heat builds up in the bipolar secondary battery, and the temperature of bipolar secondary battery increases. As a method of cooling the bipolar secondary battery, a cooling medium may be caused to flow in a direction along a plane orthogonal to the stacking direction of the bipolar electrodes.

When the bipolar secondary battery is cooled by this method, however, temperature difference generates in the cooling medium at the upstream side and downstream side of the cooling medium and, hence, temperature difference naturally generates also in the plane mentioned above. Specifically, the temperature of cooling medium is lower at the upstream side than at the downstream side. Japanese Patent Laying-Open No. 2004-47262 does not disclose any method of solving such a problem.

DISCLOSURE OF THE INVENTION

An object of the present invention is to provide a battery pack capable of rectifying biased temperature distribution of the bipolar secondary battery, as well as to provide a vehicle mounting such a battery pack.

In summary, the present invention provides a battery pack, provided with a battery assembly including a plurality of battery modules stacked together. Each of the plurality of battery modules has a positive electrode and a negative electrode stacked together, and an electrolyte arranged between the positive electrode and the negative electrode. Stacking direction of the plurality of battery modules is the same as stacking direction of the positive electrode and the negative electrode. The battery pack further includes a cooling passage allowing passage of a cooling medium. The cooling passage includes an inlet passage, an outlet passage and a direction turning portion. The inlet passage is provided along that one of the plurality of battery modules arranged at one end in the stacking direction, through which the cooling medium is introduced. The outlet passage is provided along that one of the plurality of electrode modules arranged at the other end in the stacking direction, through which the cooling medium is let out. The direction turning portion changes flow direction of the cooling medium introduced from the inlet passage and passes the cooling medium to the outlet passage.

Preferably, the cooling passage is integrated with a casing, housing the battery assembly therein. An inlet port of the cooling medium of the inlet passage and an outlet port of the cooling medium of the outlet passage are provided on one same surface of the casing.

More preferably, the battery assembly further includes an external terminal electrically connected to the positive electrode or the negative electrode. At least on one surface of the casing, a lead-out portion is provided for taking out the external terminal from inside of the casing to the outside of the casing.

More preferably, the casing includes first and second inner walls facing the battery module arranged at one end and the battery module arranged at the other end, respectively. The battery assembly is housed in the casing, in a state pressed in the stacking direction. Between the first inner wall portion and the battery assembly and between the second inner wall portion and the battery assembly, an insulator is provided.

More preferably, the casing includes an upper case positioned above the battery assembly, and a lower case positioned below the battery assembly. The upper case and the lower case are fastened by a bolt.

More preferably, the upper case and the lower case are fastened with an insulator posed therebetween. The bolt is formed of an insulator. The battery assembly is housed in the casing in a state pressed in the stacking direction.

Preferably, a plurality of walls dividing the cooling passage into a plurality of passages are formed in the cooling passage.

More preferably, among the plurality of passages, one positioned at a central portion of the cooling passage has a narrower width than that one of the plurality of passages which is positioned at an end portion of the cooling passage.

Preferably, between adjacent two battery modules among the plurality of battery modules, a conductive member is provided. On a side of a first main surface of the conductive member, the positive electrode of one of the two battery modules is arranged. On a side of a second main surface of the conductive member, the negative electrode of the other of the two battery modules is arranged. The positive electrode is a positive electrode active material layer formed on the first main surface. The negative electrode is a negative electrode active material layer formed on the second main surface.

According to another aspect, the present invention provides a vehicle, including a seat arranged in a vehicle interior, and a battery pack arranged below the seat. The battery pack includes a battery assembly having a plurality of battery modules stacked together. Each of the battery modules has a positive electrode and a negative electrode stacked together, and an electrolyte arranged between the positive electrode and the negative electrode. Stacking direction of the plurality of battery modules is the same as stacking direction of the positive electrode and the negative electrode. The battery pack further includes a cooling passage allowing passage of a cooling medium. The cooling passage includes an inlet passage, an outlet passage and a direction turning portion. The inlet passage is provided along that one of the plurality of electrode modules arranged at one end in the stacking direction, through which the cooling medium is introduced. The outlet passage is provided along that one of the plurality of electrode modules arranged at the other end in the stacking direction, through which the cooling medium is let out. The direction turning portion changes flow direction of the cooling medium introduced from the inlet passage and passes the cooling medium to the outlet passage.

Preferably, the cooling passage is integrated with a casing, housing the battery assembly therein. An inlet port of the cooling medium of the inlet passage and an outlet port of the cooling medium of the outlet passage are provided on one same surface of the casing.

More preferably, the battery assembly further has an external terminal electrically connected to the positive electrode or the negative electrode. At least on one surface of the casing, a lead-out portion is provided for taking out the external terminal from inside of the casing to the outside of the casing.

More preferably, the casing includes first and second inner walls facing the battery module arranged at one end and the battery module arranged at the other end, respectively. The battery assembly is housed in the casing, in a state pressed in the stacking direction. Between the first inner wall portion and the battery assembly and between the second inner wall portion and the battery assembly, an insulator is provided.

More preferably, the casing includes an upper case positioned above the battery assembly, and a lower case positioned below the battery assembly. The upper case and the lower case are fastened by a bolt.

More preferably, the upper case and the lower case are fastened with an insulator posed therebetween. The bolt is formed of an insulator. The battery assembly is housed in the casing in a state pressed in the stacking direction.

Preferably, a plurality of walls dividing the cooling passage into a plurality of passages are formed in the cooling passage.

More preferably, among the plurality of passages, one positioned at a central portion of the cooling passage has a narrower width than that one of the plurality of passages which is positioned at an end portion of the cooling passage.

Preferably, between adjacent two battery modules among the plurality of battery modules, a conductive member is provided. On a side of a first main surface of the conductive member, the positive electrode of one of the two battery modules is arranged. On a side of a second main surface of the conductive material, the negative electrode of the other of the two battery modules is arranged. The positive electrode is a positive electrode active material layer formed on the first main surface. The negative electrode is a negative electrode active material layer formed on the second main surface.

Therefore, according to the present invention, biased temperature distribution in the bipolar secondary battery can be rectified.

BEST MODES FOR CARRYING OUT THE INVENTION

In the following, embodiments of the present invention will be described in detail, with reference to the figures. Throughout the figures, the same or corresponding portions are denoted by the same reference characters.

[Embodiment 1]

Figure 1:
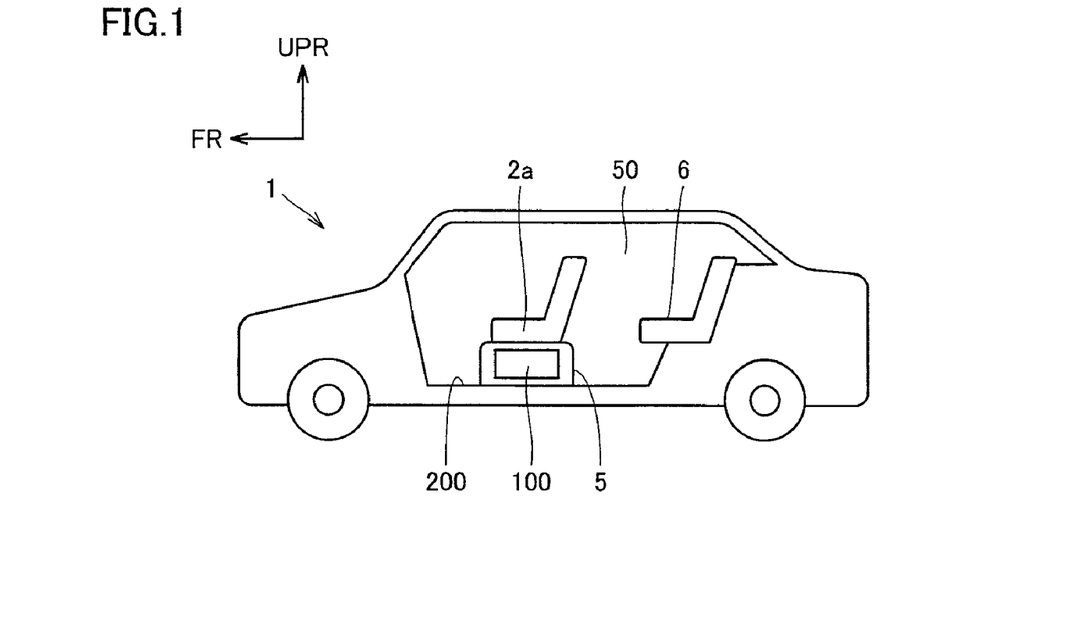
FIG. 1 is a schematic cross-sectional view showing an embodiment of the vehicle mounting the battery pack in accordance with the present invention.

FIG. 1 is a schematic cross-sectional view showing an embodiment of the vehicle mounting the battery pack in accordance with the present invention.

Figure 2:
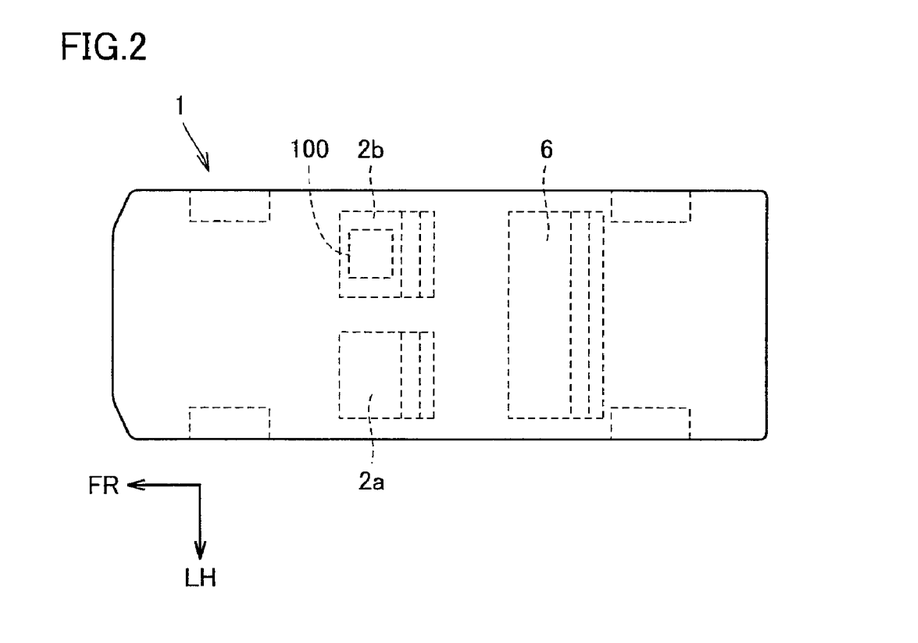
FIG. 2 is a schematic transparent plan view of the vehicle shown in FIG. 1.

FIG. 2 is a schematic transparent plan view of the vehicle shown in FIG. 1.

Referring to FIGS. 1 and 2, a vehicle 1 is, for example, an electric vehicle using a dischargeable electric power supply as a power source, or a hybrid vehicle using an internal combustion engine such as a gasoline engine or a diesel engine and a dischargeable electric power supply as the power sources. Battery pack 100 is installed as a power source of such a vehicle.

In a passenger space (vehicle interior) 50 of vehicle 1, front seats 2a and 2b (see FIG. 2) and a rear seat 6 are arranged. In the passenger space 50, battery pack 100 is arranged below front seat 2a. Battery pack 100 is surrounded by a cover 5 arranged below front seats 2a and 2b and a floor 200. Front seats 2a and 2b correspond to the "seat" of the vehicle in accordance with the present invention.

Battery pack 100 may be arranged below front seat 2b. Further, a blower fan feeding cooling air to battery pack 100 may be arranged below front seat 2a (or below front seat 2b).

It is easier to make a space for housing battery pack 100 below front seats 2a and 2b, than at other portions of vehicle 1. In most cases, a vehicle body consists of a portion that collapses and a portion that does not collapse but protects an occupant or occupants at the time of a crash. Specifically, by arranging battery pack 100 below front seat 2a (or front seat 2b), it becomes possible to protect battery pack 100 against any shock, if the vehicle body is hard hit.

In FIG. 1, the direction represented by an arrow UPR is the direction to the ceiling of vehicle 1 (upward direction), and the direction represented by an arrow FR is the forward direction of vehicle 1 (direction of travel). In FIG. 2, the direction represented by an arrow LH is the direction to the left of the vehicle 1 (left side direction).

Figure 3:
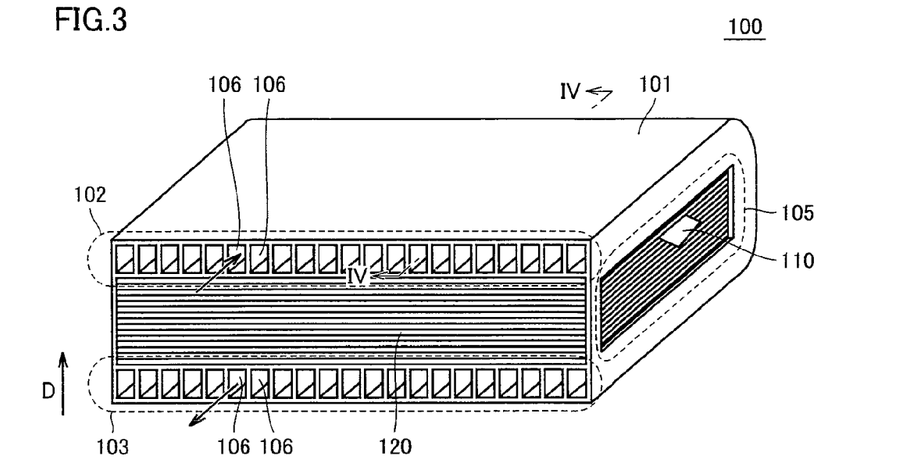
FIG. 3 shows in detail the battery pack 100 shown in FIGS. 1 and 2.

FIG. 3 shows in detail the battery pack 100 shown in FIGS. 1 and 2.

Referring to FIG. 3, battery pack 100 includes a bipolar secondary battery 120 and a cooling passage through which a cooling medium flows. Though the cooling medium is cooling air in the present embodiment, it may be cooling water. The cooling passage is divided into a plurality of passages by a plurality of walls 106. The plurality of walls 106 attain not only the function of dividing the cooling passage but also the function of heat radiating fins.

By cooling bipolar secondary battery 120, lowering of battery output can be prevented. Therefore, if vehicle 1 shown in FIG. 1 is a hybrid vehicle mounting battery pack 100, better mileage can be attained.

Bipolar secondary battery 120 is a battery assembly including a plurality of battery modules (battery cells) stacked one after another. Referring to FIG. 3, the direction of arrow D represents the direction of stacking the plurality of battery modules. Structure details of bipolar secondary battery 120 will be described later.

A casing 101 houses bipolar secondary battery 120 therein. The cooling passage described above is integral with casing 101. Integration of the cooling passage and casing 101 enables size reduction of battery pack 100.

Further, a plurality of walls provided in the cooling passage improves surface stiffness while reducing thickness, of casing 101. Therefore, it is possible to reduce weight of battery pack 100.

An inlet port 102 and an outlet port 103 for the cooling medium of cooling passage are provided on one same plane of casing 101. The cooling passage includes an inlet passage provided along a battery module at one end of the plurality of battery modules and receiving the cooling medium from inlet port 102, an outlet passage provided along a battery module at the other end of the plurality of battery modules and discharging the cooling medium from outlet port 103, and a direction turning portion provided between the inlet passage and the outlet passage, for turning the flowing direction of cooling medium coming from the inlet passage and for passing the cooling medium to the outlet passage.

In the present embodiment, the cooling medium is discharged to the same side as the introducing side. Specifically, the direction of cooling medium flowing through the inlet passage is opposite to the direction of cooling medium flowing through the outlet passage. As the cooling medium is caused to flow in this manner (a so-called counter flow method), temperature distribution of bipolar secondary battery 120 can be made uniform.

When the counter flow method and the method of causing cooling medium to flow in one direction (a so-called cross flow method) are compared, the counter flow method requires smaller amount of cooling medium necessary for cooling the bipolar secondary battery. Therefore, according to the present embodiment, power consumption of an apparatus supplying the cooling medium (for example, the blower fan) can be reduced.

An air intake duct and a ventilation duct may be attached to inlet passage 102 and outlet passage 103, respectively.

Bipolar secondary battery 120 includes an external terminal 110 for charging/discharging. External terminal 110 is a positive electrode electrode or a negative electrode electrode of bipolar secondary battery 120. On right and left side surfaces of casing 101, electrode lead-out portions 105 are formed to take out external terminal 110 from the inside to the outside of casing 101. Though only the electrode lead-out portion 105 formed on the right side surface of casing 101 is shown in FIG. 3, an electrode lead-out portion similar to electrode lead-out portion 105 is formed on the left side surface of casing 101.

Figure 4:
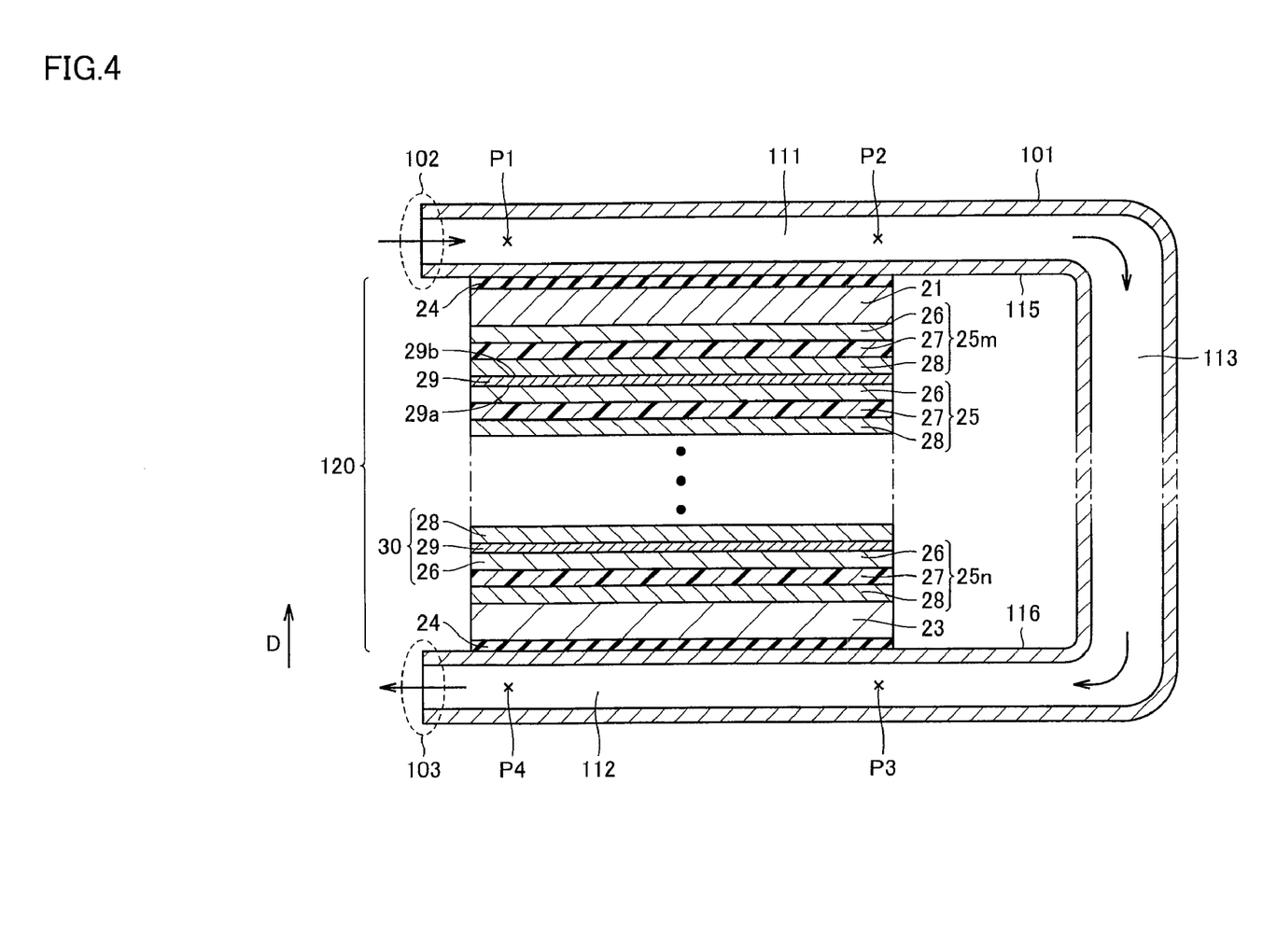
FIG. 4 is a cross-sectional view of battery pack 100 taken along the line IV-IV of FIG. 3.

FIG. 4 is a cross-sectional view of battery pack 100 taken along the line IV-IV of FIG. 3.

Referring to FIG. 4, casing 101 includes inner wall portions 115 and 116. Inner wall portions 115 and 116 face battery modules at opposite ends of the plurality of battery modules, respectively.

The space between inner wall portions 115 and 116 is set to be smaller than the thickness of bipolar secondary battery 120. Thus, bipolar secondary battery 120 is housed in casing 101, pressed along the stacking direction of the plurality of battery modules. Further, inside casing 101, bipolar secondary battery 120 is posed between inner walls 115 and 116, and therefore, bipolar secondary battery 120 can be bound and secured.

When bipolar secondary battery 120 is charged/discharged, electrons/ions move inside bipolar secondary battery 120. At the time of charging, bipolar secondary battery 120 expands in the direction of arrow D (the expanded secondary battery 120 returns to the original state at the time of discharge). Repeated charging/discharging leads to generation of a space between electrodes and variation in internal resistance, possibly degrading battery performance.

In the present embodiment, casing 101 serves as a binding member binding bipolar secondary battery 120. Therefore, variation in dimensional fluctuation experienced by the electrodes can be reduced, and degradation of battery performance can be prevented. Further, according to the present embodiment, it is possible to bind the battery without using any member such as a binding plate or a binding band.

Further, according to the present embodiment, inner wall portions 115 and 116 of casing 101 can be brought into tight contact with the surface of bipolar secondary battery 120, allowing larger amount of heat generated in bipolar secondary battery 120 to go out.

Bipolar secondary battery 120 includes a plurality of electrode sheets 25 stacked in the direction of arrow D. The direction of arrow D shown in FIG. 4 is the same as the direction of arrow D shown in FIG. 3. Electrode sheet 25 corresponds to the "battery module" of the present invention.

Electrode sheet 25 consists of a positive electrode active material layer 28 serving as the positive electrode, a negative electrode active material layer 26 serving as the negative electrode, and an electrolyte layer 27 posed between positive electrode active material layer 28 and negative electrode active material layer 26. Electrolyte layer 27 is formed of a material having ion conductivity. Electrolyte layer 27 may be a solid electrolyte, or gelled electrolyte. By interposing electrolyte layer 27, smooth ion conduction between positive electrode active material layer 28 and negative electrode active material layer 26 becomes possible, improving output of bipolar secondary battery 120.

The plurality of electrode sheets 25 are stacked such that positive electrode active material layer 28 and negative electrode active material layer 26 oppose to each other at positions where the layers extend next to each other in the stacking direction. Between each of the plurality of electrode sheets 25, a sheet type collector foil 29 is provided. Positive electrode active material layer 28 is formed on one surface 29b and negative electrode active material layer 26 is formed on the other surface 29a, of collector foil 29. Positive electrode active material layer 28 and negative electrode active material layer 26 are formed, for example, by sputtering on the surfaces of collector foil 29.

A set of positive electrode active material layer 28, collector foil 29 and negative electrode active material layer 26 arranged between electrolyte layer 27 adjacent to each other in the stacking direction of electrode sheets 25 constitute a bipolar electrode 30. In bipolar secondary battery 120, both the positive electrode active material layer 28 serving as the positive electrode and the negative electrode active material layer 26 serving as the negative electrode are formed in one bipolar electrode 30. Collector foil 29 corresponds to the "conductive member" of the present invention.

As can be seen from electrode sheets 25m and 25 shown in FIG. 4, between two adjacent battery modules among the plurality of battery modules, a conductive member (collector foil 29) is provided. On the side of a first main surface of collector foil 29, a positive electrode (positive electrode active material layer 28) of one of the two battery modules (electrode sheet 25*m*) is arranged. On the side of the second main surface of collector foil 29, a negative electrode (negative electrode active material layer 26) of the other one of the two battery modules (electrode sheet 25) is arranged.

The plurality of electrode sheets 25 include an electrode sheet 25*m* positioned on the side closest to a negative electrode collector plate 21 and an electrode sheet 25*n* positioned on the side closest to a positive electrode collector plate 23. Electrode sheet 25*m* is provided such that negative electrode active material layer 26 is arranged at the end on the side of negative electrode collector plate 21. Electrode sheet 25*n* is provided such that positive electrode active material layer 28 is arranged at the end on the side of positive electrode collector plate 23. Thus, negative electrode collector plate 21 is in contact with negative electrode active material layer 26 of electrode sheet 25*m*, and positive electrode collector plate 23 is in contact with positive electrode active material layer 28 of electrode sheet 25*n*.

An insulating film 24 is stacked to be in contact with negative electrode collector plate 21, and insulating film 24 is stacked to be in contact with positive electrode collector plate 23. Specifically, insulating film 24 is provided between inner wall portion 115 and bipolar secondary battery 120 shown in FIG. 4 and between inner wall portion 116 and bipolar secondary battery 120 shown in FIG. 4. Insulating film 24 provided on the side of positive electrode collector plate 23 prevents short-circuit between positive electrode collector plate 23 and casing 101 when bipolar secondary battery 120 is housed in casing 101. Insulating film 24 provided on the side of negative electrode collector plate 21 prevents short-circuit between negative electrode collector plate 21 and casing 101 when bipolar secondary battery 120 is housed in casing 101.

In order to further increase charging/discharging capacity of the battery, a plurality of battery assemblies (a battery assembly corresponds to the bipolar secondary battery 120 with insulating film 24 removed) may be stacked in the direction of arrow D. In that case, the plurality of battery assemblies are formed such that negative electrode collector plates 21 are in contact with each other or positive electrode collector plates 23 are in contact with each other, in adjacent two battery assemblies among the plurality of battery assemblies. By arranging the plurality of battery assemblies in this manner, the battery assemblies come to be connected in parallel. As a result, charging/discharging capacity of the battery can be increased.

Further, external terminal 110 shown in FIG. 3 is connected to negative electrode collector plate 21 (or positive electrode collector plate 23). Specifically, external terminal 110 is electrically connected to negative electrode active material layer 26 of electrode sheet 25*m* (or to positive electrode active material layer 28 of electrode sheet 25*n*).

In casing 101, an inlet passage 111, an outlet passage 112 and a connecting portion 113 connecting inlet passage 111 to outlet passage 112 are formed as a cooling passage. Inlet passage 111 is to cause cooling medium introduced from inlet port 102 to flow along the electrode sheet (electrode sheet 25*m*) on one end of the plurality of electrode sheets. Outlet passage 112 is to cause the cooling medium to flow along the electrode sheet (electrode sheet 25*n*) on the other end of the plurality of sheets 25 and to let out the cooling medium from outlet port 103. Connecting portion 113 is provided between inlet passage 111 and outlet passage 112. Connecting portion 113 is connected to inlet passage 111 and outlet passage 112.

Connecting portion 113 changes the direction of cooling airflow coming from inlet passage 111 and passes the cooling air to outlet passage 112. Namely, connecting portion 113 corresponds to the "direction turning portion" of the present invention.

Positions P1 to P4 in the cooling passage indicates positions near the inlet port 102, deep in the inlet passage 111, deep in the outlet passage 112 and near the outlet port 103, respectively. The flow direction of cooling medium in inlet passage 111 is opposite to the flow direction of cooling medium in outlet passage 112. As the cooling medium is caused to flow in this manner, temperature distribution at positions P1 to P4 in the cooling passage can be made uniform.

By way of example, the temperature at position P1 is 50° C., the temperature deep in inlet passage 111 is 60° C., the temperature deep in outlet passage is 70° C. and the temperature near outlet port 103 is 70° C. Specifically, average temperature near the inlet and outlet ports of the cooling passage and the average temperature at the deepest portions of the cooling passage are both around 60° C.

Further, in a bipolar secondary battery 120, generally, the length in the stacking direction of the plurality of electrode sheets 25 is significantly shorter than the shorter and longer sides of the rectangle orthogonal to the stacking direction. By way of example, when the length in the stacking direction of the plurality of electrode sheets 25 is assumed to be 1, the shorter or longer side mentioned above has the length of about 10 to about 15.

Therefore, even when temperature difference generates in the stacking direction of the plurality of electrode sheets 25 because of the heat generated in bipolar secondary battery 120, the temperature distribution in this direction becomes uniform in a short period of time. Using the above example, even when the temperature at position P1 is 50° C. and the temperature at position P4 is 70° C., temperatures at positions P1 and P4 will be uniform at about 60° C. after a short time.

Next, materials forming the bipolar secondary battery 120 shown in FIG. 4 will be described in detail. Collector foil 29 is formed, for example, of aluminum. Here, even if the active material layer provided on the surface of collector foil 29 contains solid polymer electrolyte, it is possible to ensure sufficient mechanical strength of collector foil 29. Collector foil 29 may be formed by providing aluminum coating on metal other than aluminum such as copper, titanium, nickel, stainless steel (SUS) or an alloy of these metals.

Positive electrode active material layer 28 includes a positive electrode active material and a solid polymer electrolyte. Positive electrode active material layer 28 may contain a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the positive electrode active material, composite oxide of lithium and transition metal generally used in a lithium ion secondary battery may be used.

Examples of the positive electrode active material may include Li/Co based composite oxide such as $LiCoO_2$, Li/Ni based composite oxide such as $LiNiO_2$, Li/Mn based composite oxide such as spinel $LiMn_2O_4$, and Li/Fe based composite material such as $LiFeO_2$. Other examples are phosphate compound or sulfate compound of transition metal and lithium as $LiFePO_4$; oxide or sulfide of transition metal and lithium such as $V_2O_5$, $MnO_2$, $TiS_2$, $MoS_2$ and $MoO_3$; $PbO_2$, AgO, NiOOH and the like.

The solid polymer electrolyte is not specifically limited and it may be any ion-conducting polymer. For example, polyethylene oxide (PEO), polypropylene oxide (PPO) or copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$. The solid polymer electrolyte is included in at least one of positive electrode active material layer 28 and negative electrode active material layer 26. More preferably, the solid polymer electrolyte is included both in positive electrode active material layer 28 and negative electrode active material layer 26.

As the supporting salt, $Li(C_2F_5SO_2)_2N$, $LiBF_4$, $LiPF_6$, $LiN(SO_2C_2F_5)_2$ or a mixture of these may be used. As the electron conduction assistant, acetylene black, carbon black, graphite or the like may be used.

Negative electrode active material layer 26 includes a negative electrode active material and a solid polymer electrolyte. Negative electrode active material layer 26 may contain a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the negative electrode active material, a material generally used in a lithium ion secondary battery may be used. If a solid electrolyte is used, however, it is preferred to use a composite oxide of carbon or lithium and metal oxide or metal, as the negative electrode active material. More preferably, the negative electrode active material is formed of a composite oxide of carbon or lithium and transition metal. Further preferably, the transition metal is titanium. Specifically, it is more preferred that the negative electrode active material is of a composite oxide of titanium oxide or titanium and lithium.

As the solid electrolyte forming electrolyte layer 27, by way of example, a solid polymer electrolyte such as polyethylene oxide (PEO), polypropylene oxide (PPO) or copolymer of these may be used. The solid electrolyte contains supporting salt (lithium salt) for ensuring ion conductivity. As the supporting salt, $LiBF_4$, $LiPF_6$, $LiN(SO_2CF_3)_2$, $LiN(SO_2C_2F_5)_2$ or a mixture of these may be used.

Specific examples of materials for positive electrode active material layer 28, negative electrode active material layer 26 and electrolyte layer 27 are listed in Tables 1 to 3. Table 1 shows specific examples when electrolyte layer 27 is of an organic solid electrolyte, Table 2 shows specific examples when electrolyte layer 27 is of an inorganic solid electrolyte, and Table 3 shows specific examples when electrolyte layer 27 is of a gel electrolyte.

TABLE 1

| Positive electrode material | Negative electrode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2$(LiTFSI) |
| $LiCoO_2$ | carbon | PVdF base | — |
| $LiCoO_2$ | Li metal | ether based polymer P(EO/EM/AGE) | electrolyte salt: LiTFSI<br>ion conducting material binder: mix P(EO/EM) + $LiBF_4$ to positive electrode |
| $Li_{0.33}MnO_2$ | Li metal | P(EO/EM/AGE) | electrolyte salt: LiTFSI<br>ion conducting material binder: mix PEO-based solid polymer + LiTFSI to positive electrode |
| $Li_{0.33}MnO_2$ | Li metal | PEO base + inorganic additive | electrolyte salt: $LiClO_4$<br>ion conducting material:<br>mix KB + PEG + LiTFSI to positive electrode |
| — | — | PEG-PMMA + PEG-borate ester | electrolyte salt: LiTFSI, BGBLi |
| — | — | PEO base + 10 mass %$0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material:<br>mix KB + PVdF + PEG + LiTFSI to positive electrode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material:<br>mix KB + PVdF + PEG + LiTFSI to positive electrode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to positive electrode |
| — | — | PME400 + Group13 metal alkoxide (as Lewis acid) | electrolyte salt: LiCl |
| — | — | matrix containing poly (N-methylvinylimidazoline) (PNMVI) | electrolyte salt: $LiClO_4$ |
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>positive electrode conducting material KB + binder PVdF |
| $LiCoO_2$ | Li metal | P(EO/EM) + ether based plasticizer | electrolyte salt: LiTFSI<br>positive electrode conducting material KB + binder PVdF |

TABLE 2

| Positive electrode material | Negative electrode material | Solid Electrolyte | Remarks |
|---|---|---|---|
| $LiCoO_2$ | In | $95(0.6Li_2S \cdot 0.4SiS_2) \cdot 5Li_4SiO_4$ ($Li_2S$—$SiS_2$ based melt rapid cooled glass) | state: glass |
| — | — | $70Li_2S \cdot 30P_2S_5Li_{1.4}P_{0.6}S_{2.2}$ sulfide glass ($Li_2S$—$P_2S_5$ based glass ceramics) | state: glass forming method: mechanochemical |
| — | — | $Li_{0.35}La_{0.55}TiO_3$(LLT) (perovskite type structure) | state: ceramics form solid electrolyte porous body, fill pores with active material sol |
| — | — | $80Li_2S \cdot 20P_2S_5$ ($Li_2S$—$P_2S_5$ based glass ceramics) | state: glass forming method: mechanochemical |
| — | — | $xSrTiO_3 \cdot (1-x)LiTaO_3$ (perovskite type oxide) | state: ceramics |
| $LiCoO_2$ | Li—In metal | $Li_{3.4}Si_{0.4}P_{0.6}S_4$ (thio-LISICON Li ion conductor) | state: ceramics |
| — | — | $(Li_{0.1}La_{0.3})_xZr_yNb_{1-y}O_3$ (perovskite type oxide) | state: ceramics |
| — | — | $Li_4B_7O_{12}Cl$ | state: ceramics combine PEG as organic compound |
| — | — | $Li_4GeS_4$—$Li_3PS_4$ based crystal $Li_{3.25}Ge_{0.25}P_{0.75}S_4$ (thio-LISICON Li ion conductor) | state: ceramics |
| — | Li metal In metal | $0.01Li_3PO_4$—$0.63Li_2S$—$0.36SiS_2$ (thio-LISICON Li ion conductor) | state: ceramics |
| $LiCoO_2$ $LiFePO_4$ $LiMn_{0.6}Fe_{0.4}PO_4$ $LiNi_{0.8}Co_{0.15}Al_{0.05}O_2$ | Li metal $V_2O_5$ Li metal | $Li_3PO_{4-x}N_x$(LIPON) (lithium phosphate oxynitride glass) | state: glass |
| | | $Li_3InBr_3Cl_3$ (rock salt type Li ion conductor) | state: ceramics |
| — | — | $70Li_2S \cdot (30-x)P_2S_5 \cdot xP_2S_5$ ($Li_2S$—$P_2S_5$—$P_2S_5$ based glass ceramics) | state: glass |
| $LiCoO_{2\ etc.}$ | Li metal Sn based oxide | $Li_2O$—$B_2O_3$—$P_2O_5$ base, $Li_2O$—$V_2O_5$—$SiO_2$ base, $Li_2O$—$TiO_2$—$P_2O_5$ base, LVSO etc. | state: glass |
| — | — | $LiTi_2(PO_3)_4$(LTP) (NASICON type structure) | state: ceramics |

TABLE 3

| Positive electrode material | Negative electrode material | Polymer base | Remarks |
|---|---|---|---|
| Ni based collector | Li metal | acrylonitrile vinyl acetate (PAN-VAc based gel electrolyte) | solvent: EC + PC electrolyte salt: $LiBF_4$, $LiPF_6$, $LiN(CF_3SO_2)_2$ |
| lithium electrode | lithium electrode | triethylene glycolmethyl methacrylate (polymethyl methacrylate (PMMA) based gel electrolyte) | solvent: EC + PC electrolyte salt: $LiBF_4$ |
| $V_2O_5$/PPy composite body | Li metal | methyl methacrylate (polymethyl methacrylate gel electrolyte) | solvent: EC + DEC electrolyte salt: $LiClO_4$ |
| Li metal | Li metal | PEO/PS polymer blend gel electrolyte | solvent: EC + PC electrolyte salt: $LiClO_4$ |
| Li metal | Li metal | alkylene oxide based polymer electrolyte | solvent: PC electrolyte salt: $LiClO_4$ |
| Li metal & $LiCoO_2$ | Li metal | alkylene oxide based polymer electrolyte | solvent: EC + GBL electrolyte salt: $LiBF_4$ |
| Li metal | Li metal | polyolefin based base polymer | solvent: EC + PC electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC electrolyte salt: $LiN(CF_3SO_2)_2$ |
| $LiCoO_2$ | Li metal | PEO based and acryl based polymer | solvent: EC + PC electrolyte salt: $LiBF_4$ |
| Li metal | Li metal | trimethylol propane ethoxylate acrylate (ether based polymer) | solvent: PC electrolyte salt: LiBETI, $LiBF_4$, $LiPF_6$ |
| — | — | EO-PO copolymer | electrolyte salt: LiTFSI, $LiBF_4$, $LiPF_6$ |
| — | — | poly aziridine compound | solvent: EC + DEC electrolyte salt: $LIPF_6$ |
| — | PAS (polyacene) | PVdF-HFP gel electrolyte | solvent: PC, EC + DEC electrolyte salt: $LiClO_4$, $Li(C_2F_5SO_2)_2N$ |
| — | — | urea based lithium polymer gel electrolyte | solvent: EC + DMC electrolyte salt: $LiPF_6$ |
| — | — | polyether/polyurethane based (PEO-NCO) gel electrolyte | solvent: PC electrolyte salt: $LiClO_4$ |
| — | — | cross-linked polyalkylene oxide based gel polymer electrolyte | — |

As described above, according to Embodiment 1, bias in temperature distribution in a bipolar secondary battery can be rectified using small amount of cooling medium.

[Embodiment 2]

In a bipolar secondary battery, current flows in the stacking direction of battery modules at the time of charging/discharging. The distance of heat conduction is short in the stacking direction of battery modules and, therefore, smooth heat conduction takes place. Therefore, there is small bias in temperature distribution in the stacking direction of the bipolar electrodes. In a plane orthogonal to the stacking direction of bipolar electrodes, however, temperature distribution is biased and the temperature at the central portion of the plane becomes higher than at an end portion of the plane. The reason for this is that heat more easily escapes from the end portion than at the central portion of the plane (heat tends to be kept in). According to Embodiment 2, such bias of temperature distribution can be rectified.

Figure 5:
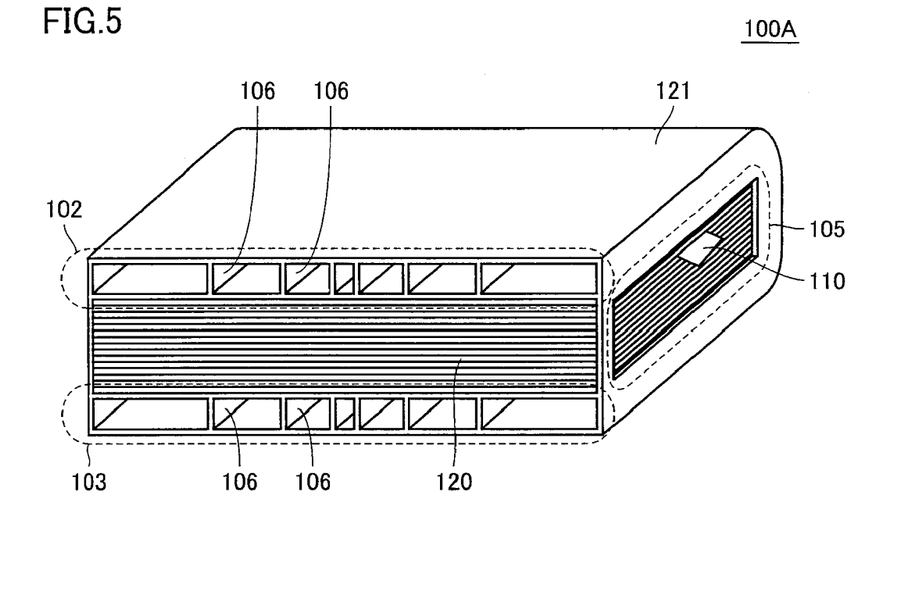
FIG. 5 is a perspective view showing a structure of a battery pack in accordance with Embodiment 2.

FIG. 5 is a perspective view of the battery pack in accordance with Embodiment 2.

Referring to FIGS. 5 and 3, a battery pack 100A is different from battery pack 100 in that it includes a casing 121 in place of casing 101. Other portions of battery pack 100A are the same as the corresponding portions of battery pack 100 and, therefore, description thereof will not be repeated.

As in Embodiment 1, the cooling passage is integrated with casing 121. The cooling passage is divided into a plurality of passages by a plurality of walls 106. Among the plurality of passages, the passage positioned at the central portion of the cooling passage has narrower width than passages positioned at end portions of the cooling passage. Therefore, in Embodiment 2, cooling efficiency at the central portion of the plane orthogonal to the stacking direction of the bipolar electrodes can be improved.

Figure 6:
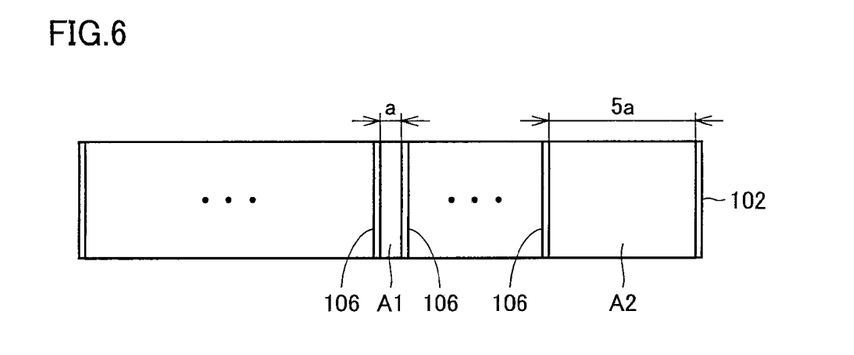
FIG. 6 schematically shows an inlet port 102 of a casing 121 shown in FIG. 5.

FIG. 6 schematically shows inlet port 102 of casing 121 shown in FIG. 5.

Referring to FIGS. 6 and 5, inlet port 102 is sectioned by the plurality of walls 106. Specifically, the cooling passage is divided into a plurality of passages by the plurality of walls.

The width of passage A1 positioned near the center of the cooling passage is narrower than the width of passage A2 positioned at an end side of the cooling passage. As shown in FIG. 6, the width of passage A1 is, for example, a, and the width of passage A2 is 5a (5 times wider than passage A1). These widths of passages A1 and A2 are not limiting.

As the width of passage A2 is five times that of passage A1, the amount of heat transferred from the bipolar secondary battery 120 to passage A2 is approximately five times larger than the amount of heat transmitted from the bipolar secondary battery 120 to passage A1. The heat radiating area of passage A2 is, however, not five times larger than the heat radiating area of passage A1. The heat radiating area is mainly determined dependent on the area of wall 106 (heat radiating fin), that is, (height of wall 106)×(passage length). Specifically, the heat radiating area of passage A2 is the same as the heat radiating area of passage A1.

This means that passage A2 tends to keep more heat than passage A1. In other words, heat more easily escapes from passage A1 than passage A2.

Further, passage A1 is narrower than passage A2 and, therefore, the cooling air flows through passage A1 faster than through passage A2, so that heat more easily escapes from passage A1. In this way, not only the relation between the heat receiving area and heat radiating area but also the speed of cooling air make it easier for the heat to escape from passage A1 than passage A2. Thus, the cooling performance is higher at the central portion than at an end portion of the cooling passage.

As described above, according to Embodiment 2, the cooling efficiency at the central portion of a plane orthogonal to the stacking direction of bipolar electrodes can be improved. Therefore, according to Embodiment 2, bias in temperature distribution of the bipolar secondary battery can be rectified.

Further, in bipolar secondary battery 120, the temperature at the central portion of the plane orthogonal to the stacking direction of bipolar electrodes tends to be high and, hence, this portion particularly tends to expand. According to Embodiment 2, the passage is made to have narrower width near the central portion of the cooling passage (space between each of the plurality of walls is made dense). This increases strength at the central portion of casing 121 and, hence, expansion of bipolar secondary battery can be prevented.

[Embodiment 3]

Figure 7:
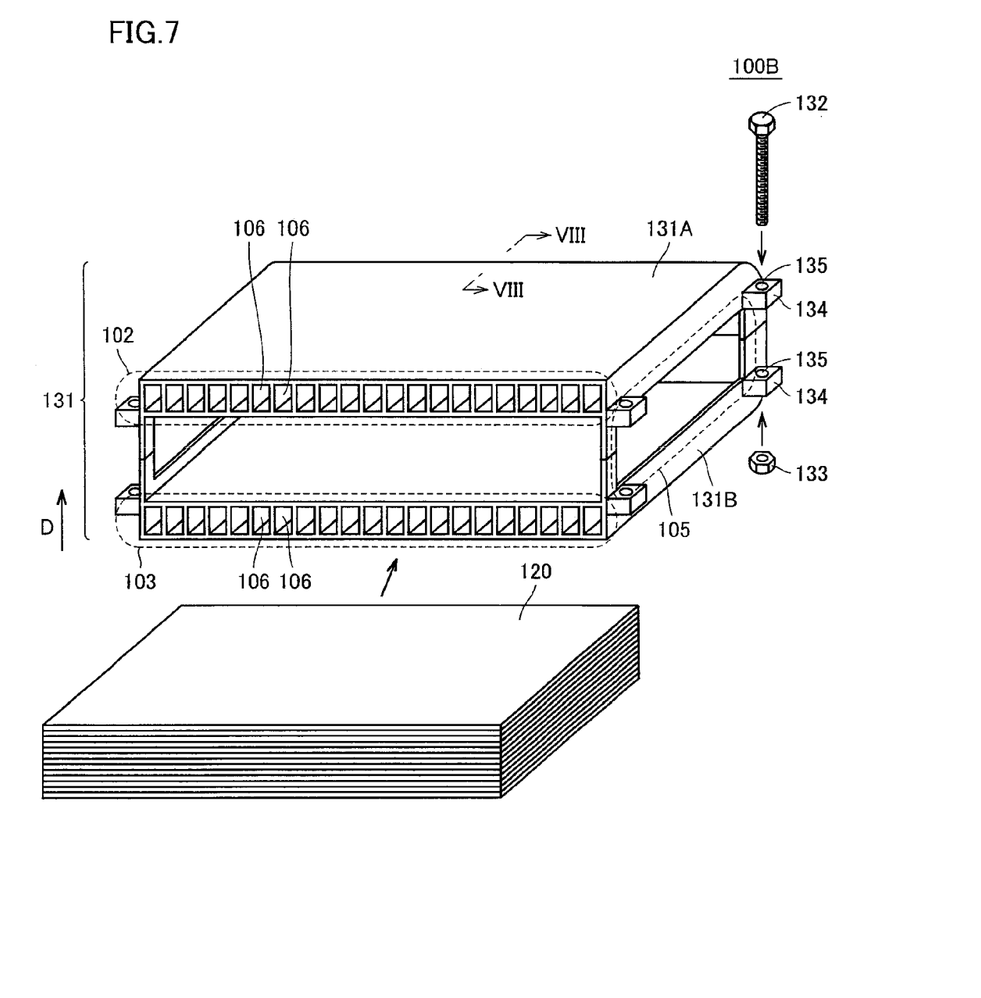
FIG. 7 is a perspective view showing a structure of a battery pack in accordance with Embodiment 3.

FIG. 7 is a perspective view showing a structure of the battery pack in accordance with Embodiment 3.

Referring to FIGS. 7 and 3, a battery pack 100B is different from battery pack 100 in that it includes a casing 131 in place of casing 101. Other portions of battery pack 100B are the same as the corresponding portions of battery pack 100 and, therefore, description thereof will not be repeated.

For convenience of description, in FIG. 7, casing 131 and bipolar secondary battery 120 are shown separately. In battery pack 100B, however, bipolar secondary battery 120 is housed in casing 131. In FIG. 7, external terminal 110 of bipolar secondary battery 120 is not shown.

Casing 131 includes an upper case 131A arranged above bipolar secondary battery 120, and a lower case 131B arranged below bipolar secondary battery 120. In short, casing 131 is formed separable into two in the vertical direction (direction of arrow D). Therefore, according to Embodiment 3, the casing can be manufactured easier than when the casing is formed as a single piece.

Upper case 131A and lower case 131B are fastened by a bolt 132 and a nut 133. Therefore, according to Embodiment 3, stiffness of the casing can be improved. Upper case 131A and lower case 131B are each provided with a fastening portion 134. Bolt 132 is inserted to a hole 135 formed in fastening portion 134.

Figure 8:
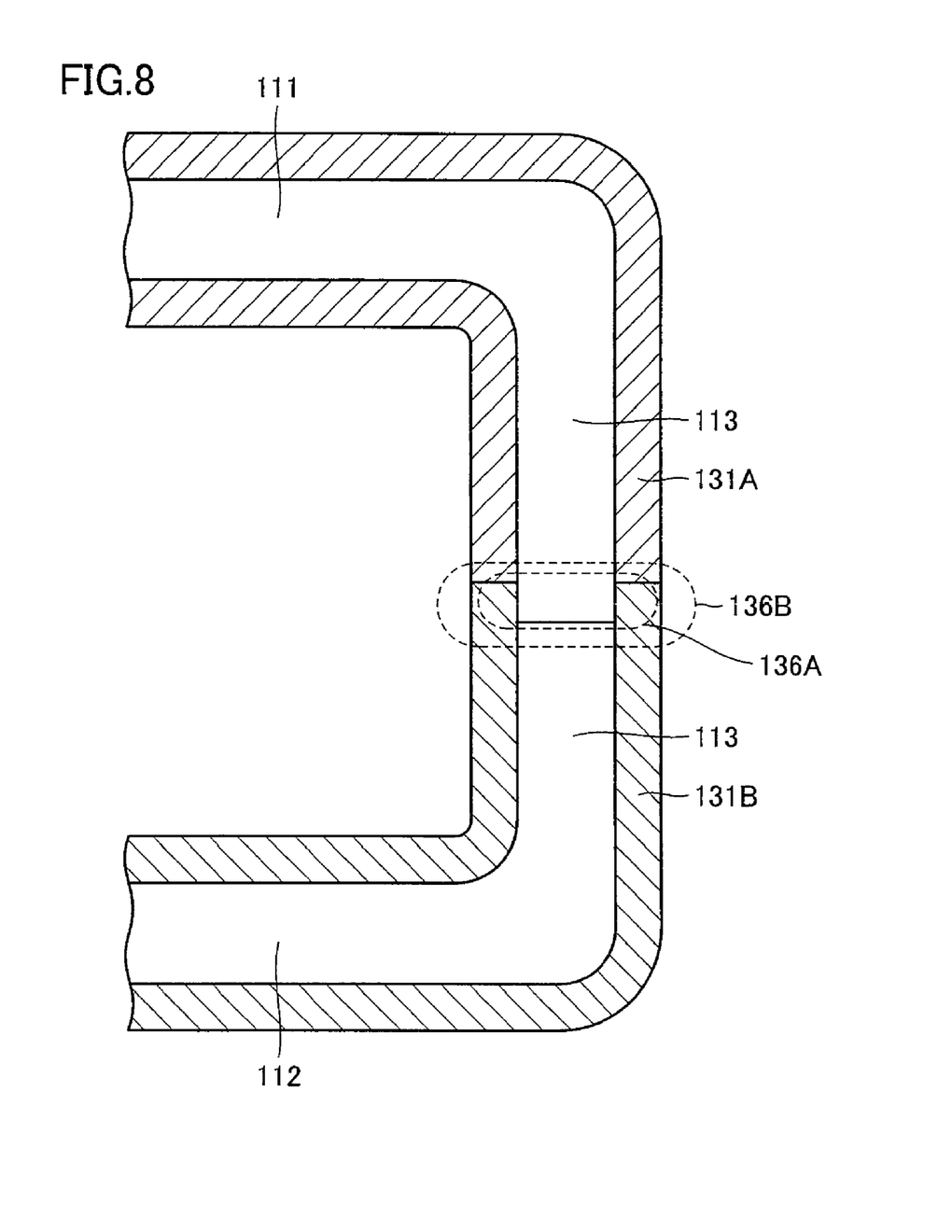
FIG. 8 is a cross sectional view taken along the line VIII-VIII of FIG. 7.

FIG. 8 is a cross-sectional view taken along the line VIII-VIII of FIG. 7.

Referring to FIG. 8, a protruded fitting portion 136A is formed on upper case 131A, while a recessed fitting portion 136B is formed on lower case 131B. By coupling fitting portions 136A and 136B with each other, the cooling passage consisting of inlet passage 111, connecting portion 113 and outlet passage 112 is formed in casing 131 shown in FIG. 7. In order to prevent leakage of cooling medium, a sealing member or packing may be provided at the coupling portion between fitting portions 136A and 136B.

Description will be given again referring to FIG. 7. When casing 131 is formed as a single piece, there may possibly be a dimensional error at a portion housing bipolar secondary battery 120 (that is, the space between inner walls 115 and 116 shown in FIG. 4). In that case, the effect of binding bipolar secondary battery 120 possibly becomes weak and the effect of heat radiation of bipolar secondary battery possibly becomes weak. By the structure of the battery pack in accordance with Embodiment 3, it becomes possible to apply appropriate pressure to bipolar secondary battery 120. Therefore, Embodiment 3 allows appropriate cooling and binding of bipolar secondary battery 120.

[Embodiment 4]

Figure 9:
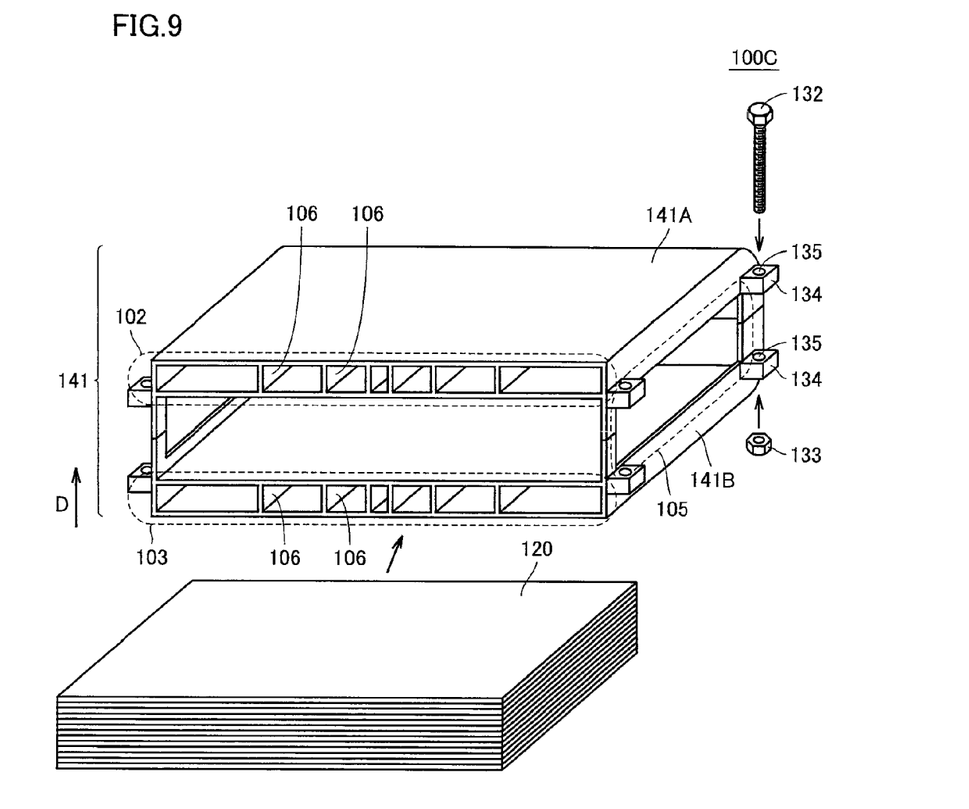
FIG. 9 is a perspective view showing a structure of a battery pack in accordance with Embodiment 4.

FIG. 9 is a perspective view showing a structure of a battery pack in accordance with Embodiment 4.

Referring to FIGS. 9 and 7, a battery pack 100C is different from battery pack 100B in that it includes a casing 141 in place of casing 131. Other portions of battery pack 100C are the same as the corresponding portions of battery pack 100B and, therefore, description thereof will not be repeated.

As in FIG. 7, though casing 141 and bipolar secondary battery 120 are shown separately, bipolar secondary battery 120 is housed in casing 151. In FIG. 9, external terminal 110 of bipolar secondary battery 120 is not shown.

Casing 141 includes an upper case 141A arranged above bipolar secondary battery 120, and a lower case 141B arranged below bipolar secondary battery 120. As in Embodiment 3, upper case 141A and lower case 141B are fastened by bolt 132 and nut 133. Therefore, according to Embodiment 4, the casing can be manufactured easily and the stiffness of casing can be improved. Further, Embodiment 4 allows appropriate cooling and binding of bipolar secondary battery 120.

The cooling passage is integrated with casing 141. The cooling passage is divided into a plurality of passages by a plurality of walls 106. As in Embodiment 2, among the plurality of passages, one positioned at the center of the cooling passage has narrower width than the one among the plurality of passages which is at an end portion of the cooling passage.

Therefore, according to Embodiment 4, cooling efficiency at the central portion of a plane orthogonal to the stacking direction of bipolar electrodes can be improved. Specifically, Embodiment 4 rectifies bias in temperature distribution of the bipolar secondary battery.

Further, according to Embodiment 4, the strength at the central portion of casing 141 can be improved and, hence, expansion of the bipolar secondary battery can be prevented.

[Embodiment 5]

Figure 10:
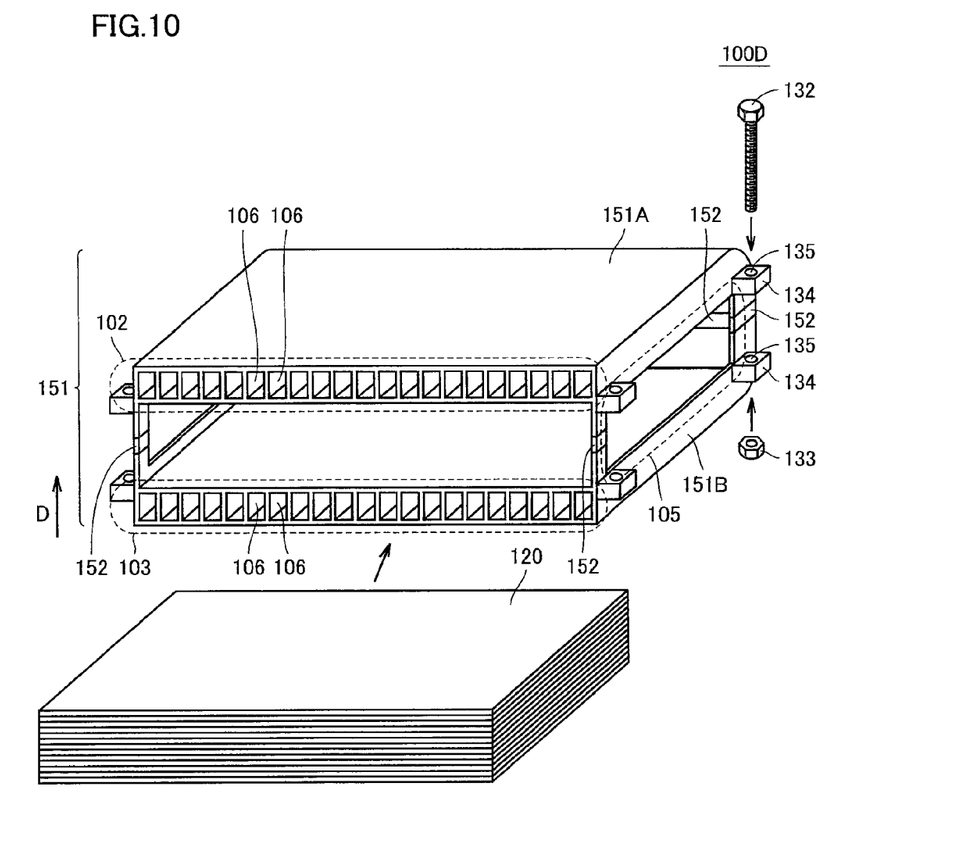
FIG. 10 is a perspective view showing a structure of a battery pack in accordance with Embodiment 5.

FIG. 10 is a perspective view showing a structure of a battery pack in accordance with Embodiment 5.

Referring to FIGS. 10 and 7, a battery pack 100D is different from battery pack 100B in that it includes a casing 151 in place of casing 121. Other portions of battery pack 100D are the same as the corresponding portions of battery pack 100B and, therefore, description thereof will not be repeated.

As in FIG. 7, though casing 151 and bipolar secondary battery 120 are shown separately, bipolar secondary battery 120 is housed in casing 151. In FIG. 10, external terminal 110 connected to bipolar secondary battery 120 is not shown.

Casing 151 includes an upper case 151A arranged above bipolar secondary battery 120, a lower case 151B arranged below bipolar secondary battery 120, and an insulating member 152 posed between upper case 151A and lower case 151B. In Embodiment 5, bolt 132 and nut 133 are also formed of an insulator.

Referring to FIGS. 10 and 4, the battery pack in accordance with Embodiment 5 will be described. Upper case 151A and lower case 151B are insulated by insulating member 152. Further, bolt 132 and nut 133 are also insulated by the insulator. Therefore, when negative electrode collector plate 21 and positive electrode collector plate 23 of bipolar secondary battery 120 are brought into direct contact with upper case 151A and lower case 151B, short-circuit between negative electrode collector plate 21 and positive electrode collector plate 23 can be prevented.

Therefore, in Embodiment 5, insulating film 24 is unnecessary. Further, in Embodiment 5, negative electrode collector plate 21 and positive electrode collector plate 23 can be brought into direct contact with upper case 151A and lower case 151B and, therefore, cooling efficiency of the bipolar secondary battery can be improved than in Embodiments 1 to 4.

Each of the battery packs 100A to 100D is arranged, for example, in vehicle 1 shown in FIGS. 1 and 2, as is battery pack 100.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A battery pack, comprising:
a battery assembly including a plurality of stacked battery modules stacked together, each having
a positive electrode and a negative electrode stacked together, and
an electrolyte arranged between said positive electrode and said negative electrode;
stacking direction of said plurality of battery modules being the same as stacking direction of said positive electrode and said negative electrode;
a cooling passage allowing passage of a cooling medium, said cooling passage including
an inlet passage provided along a first one of said plurality of battery modules arranged at one end in said stacking direction, through which said cooling medium is introduced,
an outlet passage provided along a second one of said plurality of battery modules arranged at the other end in said stacking direction, through which said cooling medium is let out,
a direction turning portion changing flow direction of said cooling medium introduced from said inlet passage and passing said cooling medium to said outlet passage, and
a plurality of walls dividing said cooling passage into a plurality of passages are formed in said cooling passage,
wherein among said plurality of passages, one positioned at a central portion of said cooling passage has a narrower width than another of the plurality of passages that is positioned at an end portion of said cooling passage.

2. The battery pack according to claim 1, wherein
said cooling passage is integrated with a casing, housing said battery assembly therein; and
an inlet port of said cooling medium of said inlet passage and an outlet port of said cooling medium of said outlet passage are provided on one same surface of said casing.

3. The battery pack according to claim 2, wherein
said casing includes
an upper case positioned above said battery assembly, and
a lower case positioned below said battery assembly; and
said upper case and said lower case are fastened by a bolt.

4. The battery pack according to claim 3, wherein
said upper case and said lower case are fastened with an insulator posed therebetween;
said bolt is formed of an insulator; and
said battery assembly is housed in said casing in a state pressed in said stacking direction.

5. The battery pack according to claim 2, wherein
said battery assembly further includes an external terminal electrically connected to said positive electrode or said negative electrode; and
at least on one surface of said casing, a lead-out portion is provided for taking out said external terminal from inside of said casing to the outside of said casing.

6. The battery pack according to claim 2, wherein said casing includes first and second inner walls facing said battery module arranged at one end and said battery module arranged at the other end, respectively;

said battery assembly is housed in said casing, in a state pressed in said stacking direction; and between said first inner wall portion and said battery assembly and between said second inner wall portion and said battery assembly, an insulator is provided.

7. The battery pack according to claim 1, wherein between adjacent two battery modules among said plurality of battery modules, a conductive member is provided;

on a side of a first main surface of said conductive member, said positive electrode of one of said two battery modules is arranged;

on a side of a second main surface of said conductive member, said negative electrode of the other of said two battery modules is arranged;

said positive electrode is a positive electrode active material layer formed on said first main surface; and said negative electrode is a negative electrode active material layer formed on said second main surface.

8. A vehicle, comprising:

a divided seat arranged in a vehicle interior; and the battery pack according to claim 1, said battery pack being arranged below said divided seat.

\* \* \* \* \*

UNITED STATES PATENT AND TRADEMARK OFFICE
CERTIFICATE OF CORRECTION

PATENT NO. : 8,387,733 B2
APPLICATION NO. : 12/294528
DATED : March 5, 2013
INVENTOR(S) : Yoshiyuki Nakamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1197 days.

Signed and Sealed this
First Day of September, 2015

Michelle K. Lee
*Director of the United States Patent and Trademark Office*